United States Patent [19]

Davis et al.

[11] Patent Number: 4,855,914

[45] Date of Patent: Aug. 8, 1989

[54] COMPUTER CONTROLLABLE SYNCHRONOUS SHIFTING OF AN AUTOMATIC TRANSMISSION

[76] Inventors: Roy I. Davis, 9214 Abbey La., Ypsilanti, Mich. 48198; Prabhakar B. Patil, 10294 W. Outer Dr., Detroit, Mich. 48223

[21] Appl. No.: 126,064

[22] Filed: Nov. 27, 1987

[51] Int. Cl.$^4$ .................... B60K 41/18; G05D 17/02
[52] U.S. Cl. .................................. 364/424.1; 74/866
[58] Field of Search ............... 364/424.1; 74/336 R, 74/865, 866, 867, 868

[56] References Cited

U.S. PATENT DOCUMENTS

| | | | |
|---|---|---|---|
| Re. 32,591 | 2/1988 | Richards | 74/866 |
| 4,595,986 | 6/1986 | Daubenspeck et al. | 364/424.1 |
| 4,616,531 | 10/1986 | Ogasawara et al. | 74/866 |
| 4,726,245 | 2/1988 | Klaue | 74/336 R |
| 4,753,134 | 6/1988 | Hayasaki | 74/866 |
| 4,754,403 | 6/1988 | Hiramatsu | 364/424.1 |
| 4,799,158 | 1/1989 | Patil | 364/424.1 |
| 4,821,190 | 4/1989 | Patil | 364/424.1 |

*Primary Examiner*—Felix D. Gruber
*Attorney, Agent, or Firm*—Frank G. McKenzie; Donald J Harrington

[57] ABSTRACT

A multiple forward speed automatic transmission produces its lowest forward speed ratio when a hydraulic clutch and hydraulic brake are disengaged and a one-way clutch connects a ring gear to the transmission casing. Second forward speed ratio results when the hydraulic clutch is engaged to connect the ring gear to the planetary carrier of a second gear set. Reverse drive and regenerative operation result when an hydraulic brake fixes the planetary and the direction of power flow is reversed. Various sensors produce signals representing the torque at the output of the transmission or drive wheels, the speed of the power source, and the hydraulic pressure applied to a clutch and brake. A control algorithm produces input data representing a commanded upshift, a commanded downshift, a commanded transmission output torque, and commanded power source speed. A microprocessor processes the inputs and produces a response to them in accordance with the execution of a control algorithm. Output or response signals cause selective engagement and disengagement of the clutch and brake at a rate that satisfies the requirements for a short gear ratio change and smooth torque transfer between the friction elements.

22 Claims, 4 Drawing Sheets

COMPUTER CONTROLLABLE SYNCHRONOUS SHIFTING OF AN AUTOMATIC TRANSMISSION

The government has rights in this invention pursuant to contract #DE-AC07-85NV-10418 awarded by the U.S. Department of Energy.

CROSS REFERENCES

U.S. Ser. No. 867,177, filed May 27, 1986 and now U.S. Pat. No. 4,799,158; and U.S. Ser. No. 6,838 filed Jan. 27, 1987 and now U.S. Pat. No. 4,821,190.

BACKGROUND OF THE INVENTION

1. Field of the Invention

This invention relates to a control system for an automatic transmission of the type having planetary gearsets and hydraulically actuated brakes and clutches, which selectively hold components of one or more gearsets to produce the various drive ratios of the transmission. More particularly, the present invention relates to a control system having feedback loops for controlling the synchronous operation of hydraulically actuated friction elements and a feedback loop for controlling the output torque of a power source during a power-on gear ratio change.

2. Description of the Prior Art

Hydraulically actuated, automatic transmissions generally include a turbine driven hydrodynamically from the impeller of a torque converter, the turbine transmitting power to a gearset to produce the forward drive and reverse gear ratios. When any forward or reverse gear ratio is selected, though the vehicle is coasting or standing at idle, the engine transmits torque through the torque converter, various clutches and gears to the drive wheels. Automatic transmissions can have the gear ratio changes produced as a result of repetitively executing an algorithm that produces a gear change command signal when the transmission is to be shifted and a signal representing the gear ratio to which the transmission is to be shifted.

The gearing arrangements of automatic transmissions typically include one or more passive overrunning clutches necessary to avoid disc clutch to disc clutch, i.e. synchronous, shifts under power, while the power plant output torque is directly influencing the transmission output, and hence the driver's perception of the shift smoothness. Overrunning clutches are used because of the difficulty in achieving the desired level of active clutch torque control necessary to avoid extremely harsh shifts. Such synchronous shifts are accomplished, according to the method of this invention, by maintaining precise control over the hydraulic pressures that engage and disengage the disc clutches, simplifying the overall gearing arrangement, maintaining precise control over the power source output torque, and using closed loop feedback control on the transmission output variables, thereby eliminating several unnecessary passive clutches.

SUMMARY OF THE INVENTION

The method according to this invention controls the gear ratio changes of a motor vehicle multiple gear ratio, automatic transmission that driveably connects a power source to the drive wheels of the vehicle by synchronously controlling the engagement and disengagement of friction clutches and brakes under power-on conditions. The power source, which may be either an electric motor or an internal combustion engine, is adapted to produce an output torque that is transmitted directly to the input of the transmission. The method controls the operation of an automotive powertrain, which includes a power source, a multiple speed ratio transmission, a friction clutch and friction brake, to produce the various gear ratio changes. An ancillary benefit of the control afforded by the technique of this invention is the improvement in powertrain efficiency due to the elimination of the torque converter normally associated with an automatic transmission.

This technique is implemented with a closed loop feedback control system whose control variables are the torque command for the power plant and the hydraulic pressure commands to the hydraulic control or actuating elements. The variables being controlled are the wheel torque and the power plant speed.

The mathematical model of the control system and the powertrain is simulated using algorithms stored in an electronic memory that is accessible to the central processing unit of an electronic computer in order to evaluate the response of the system to alternative control techniques. When the control technique is finalized, the mathematical model less those elements representing the powertrain hardware is converted to a discrete time representation and programmed for repetitive execution by an on-board microprocessor. The microprocessor has access, through appropriate transducers and converter electronics, to the required control variables, as defined by the computer simulation. The microprocessor generates clutch pressure and power source torque commands in accordance with the control technique, which are then output to the vehicle through appropriate converter electronics and transducers.

DESCRIPTION OF THE PREFERRED EMBODIMENT

Figures 1, 2C:
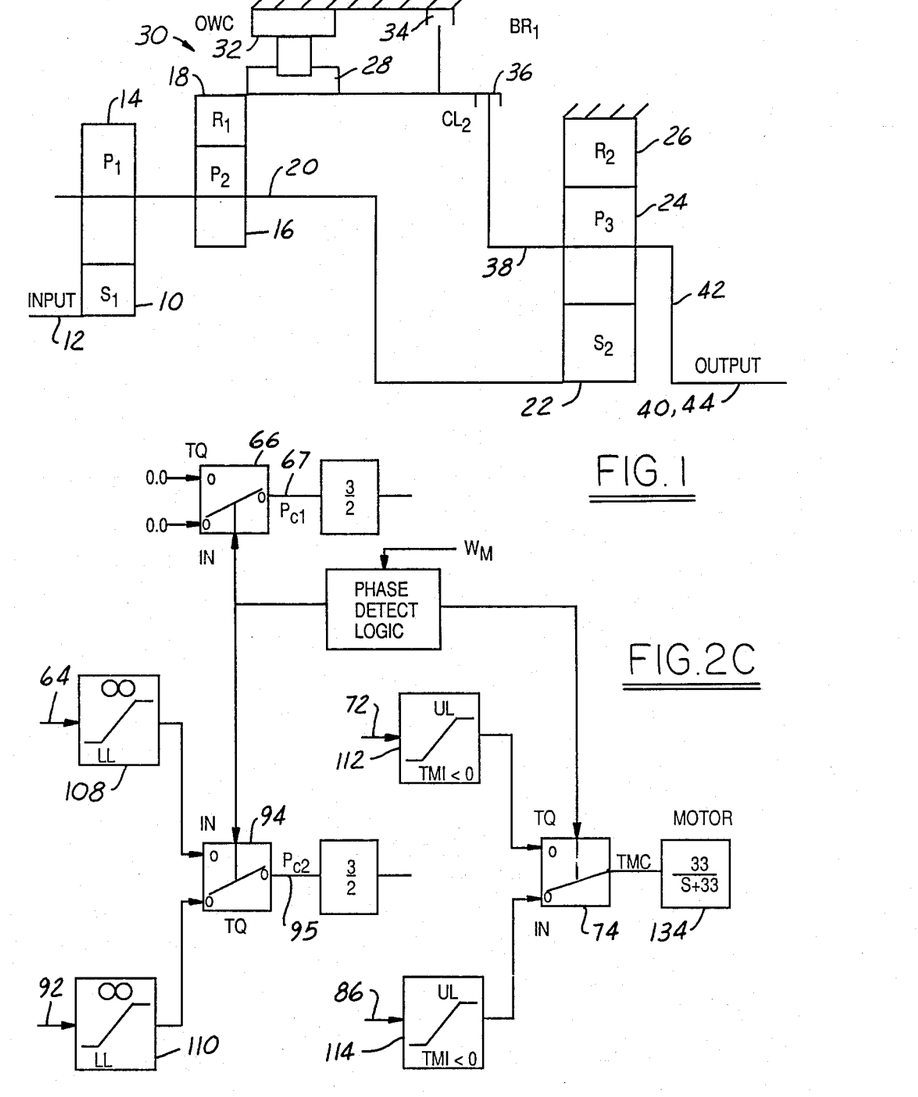
FIG. 1 shows schematically a planetary gear arrangement, overrunning clutch, hydraulic brake and clutches of automatic transmission whose gear ratio changes are made through operation of the control system according to this invention.
FIG. 2C shows the changes in the system required to control an upshift.

Referring first to FIG. 1, a two-speed planetary automatic transmission controlled by the method of this invention has a first planetary stage that includes a sun gear 10, which is driven through an input shaft 12 from a power source. A first set of planetary pinions 14 is in continuous meshing engagement with the sun gear and is formed integrally with a second set of planetary pinions 16, which is continuously engaged with the teeth of a ring gear 18. These planetary pinion sets are rotatably supported on a first stage carrier 20, through which power is transmitted to a second sun gear 22, a component of a second stage planetary gear set that includes a set of planetary pinions 24, which are continuously engaged with sun gear 22 and a second stage ring gear 26.

Ring gear 18 is connected to the inner driver element 28 of an overrunning or one-way clutch 30, whose outer driven element 32 is secured against rotation to the transmission casing. Ring gear 18 is also connected to a disc brake 34, which is fixed to the transmission casing and operates to produce reverse drive, hill braking, low gear and regenerative braking. When brake 34 is applied, ring gear 18 is fixed to the transmission casing against rotation. Another hydraulically-actuated clutch, the second or high gear clutch 36, connects ring gear 18 to the carrier 38 of the second planetary stage.

Ring gear 26 is permanently fixed against rotation by attachment to the transmission casing. Pinion carrier 38 drives the bevel pinion shaft 42 in rotation about the central axis of the transmission, and the differential mechanism transmits power to drive shafts 40, 44, through which power is transmitted to the drive wheels of the vehicle.

To produce the first forward drive ratio, neither brake 34 nor clutch 36 is engaged. Instead, inner race or driving member 28 of overrunning clutch 30 transmits torque to the outer race 32, thereby affixing ring gear 18 against rotation through the drive connection between the inner race and the outer race to the transmission casing. Pinion carrier 20, the driven member of the first stage, transmits power to the second sun gear 22. The second planetary stage has its ring gear 26 permanently fixed against rotation; therefore, the planetary pinion carrier 38 is the driven element of the second stage. The bevel pinion shaft 42 of the differential mechanism rotates about the central axis of the transmission as carrier 38 rotates.

The second or high-speed ratio results when clutch 36 is engaged and brake 34 is disengaged. When this occurs, overrunning clutch 30 does not lock ring gear 18 to the transmission casing, but rather connects ring gear 18 to pinion carrier 38 due to the one-way drive through clutch 30. The first stage pinion carrier 20 is permanently connected to sun gear 22. The torque delivery path for high-speed ratio operation includes first sun gear 10, which is driven by the power source through input shaft 12; planet pinions 14; first planet pinion carrier 20, which drives second sun gear 22; and first ring gear 18, which is driveably connected by clutch 36 to second planet pinion carrier 38. Second ring gear 26, which is fixed to the transmission casing, provides the torque reaction point for the transmission in high gear. Pinion carrier 38 drives the bevel pinion shaft 42 in rotation about the central axis of the transmission, and the differential mechanism (not shown in FIG. 1) transmits power to the drive wheels through drive shafts 40, 44.

Reverse drive results when the rotational direction of input shaft 12 is reversed, e.g., by changing the rotation of an electric motor power source or through operation of a reverse gearset located between shaft 20 and an internal combustion engine power source, and reverse brake 34 is applied. When the direction of the input shaft is reversed, one-way clutch 30 overruns but first ring gear 18 remains fixed against rotation because brake 34 is engaged and fixes ring gear 18 to the transmission casing. In reverse drive operation, the torque delivery path is identical to that for the lowest ratio forward speed drive previously described. Input shaft 12 drives sun gear 10, pinion sets 14, 16 turn on ring gear 18, and first planetary carrier 20 drives second sun gear 22. The first and second ring gears 18, 26 are fixed against rotation to provide torque reaction points for the transmission. Output power is transmitted by the second planetary carrier 38 to bevel pinion shaft 42, which transmits power to the drive shafts through the differential mechanism.

The mechanical energy of a vehicle driven by an electric motor can be converted to electrical energy and used to recharge the batteries of the vehicle, provided the control system for the powertrain is adapted to run the motor as a generator when braking occurs, rectify the AC current to DC current and charge the battery during the braking action. This regenerative braking system can be used in cooperation with the powertrain of this invention if the control system is adapted to engage second gear clutch 36 or transmission brake 34 when wheel braking occurs. The torque used to drive the generator during regenerative braking is recovered from the wheels of the vehicle and transmitted back through the transmission to the power source while the transmission is disposed for operation in either second gear or reverse drive.

In this embodiment of the present invention, the method of the invention is applied to the synchronous shift which occurs between the second gear clutch 36 and the reverse brake 34 during the regenerative braking operation described above. The unique feature of this invention is the precise synchronous closed loop control of the hydraulic pressure responsible for the disengagement of second gear clutch 36 and the engagement of the reverse brake 32, and closed loop control of the power source output torque Tm during the shift interval, which together allow for the smooth transition of torque between the two friction elements. Results from the simulation of the transmission of this embodiment controlled by the method of this invention are shown for a typical regenerative mode downshift in FIG. 4. The technique, described more fully below for this embodiment, can be applied to other embodiments in a more general way to control all ratio changes between friction elements, thereby eliminating all passive overrunning clutches and the torque converter common to most automatic transmissions.

The control variables in the closed loop control system are clutch pressure commands $Pc_1$ and $Pc_2$, and the motor torque command Tmc. The system uses wheel torque and motor speed feedback to control the synchronous application and release of the two friction elements 34, 36 in a way that minimizes the wheel torque disturbance, completes the shift in about one-half second, and obviates the need for the one-way clutch. To achieve the accurate and rapid control of the friction elements, it is necessary to minimize the response time of the hydraulic system. This is accomplished by feeding back clutch pressure to close the loop around the variable force solenoid controlling clutch pressure and by cascading a phase lead compensator in the forward path, as shown in FIG. 2B. This results in reducing the effective hydraulic system time constant from 0.20 to 0.06 seconds.

Figure 3A:
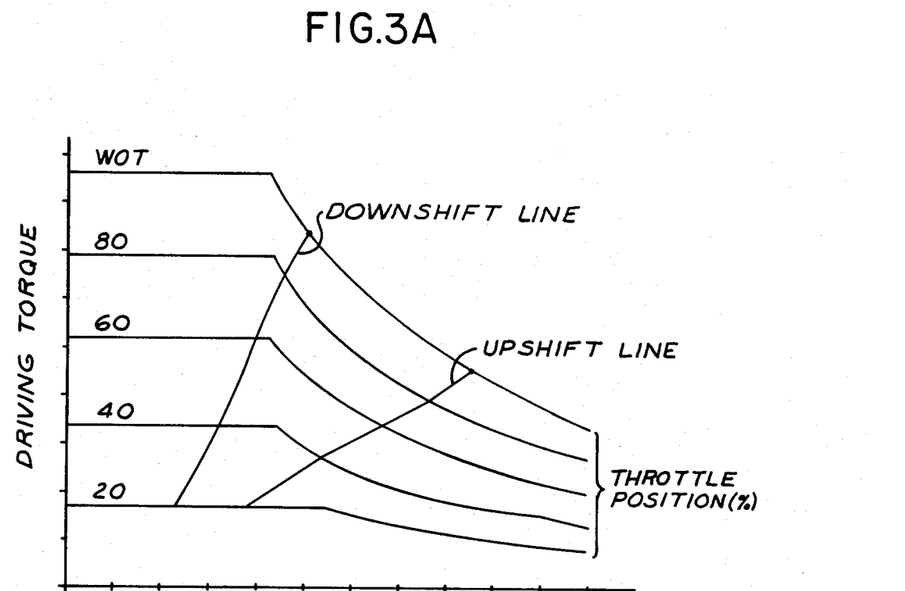
FIGS. 3A and 3B are graphs of the relationship between power source torque and power source speed for various throttle positions and brake system pressures, respectively. The graphs include lines that indicate the occurrence of upshift and downshift command signals.
Figure 3B:
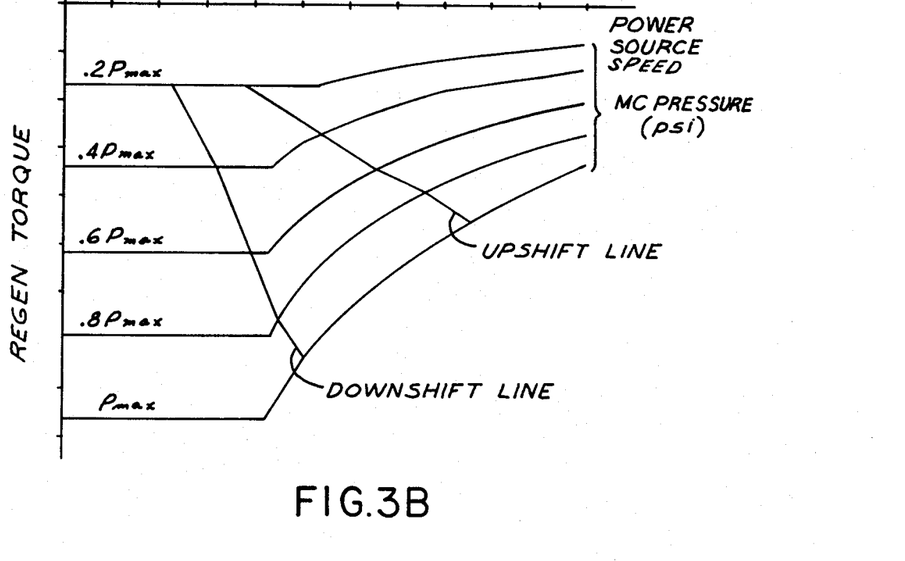

A gear ratio change during regenerative braking mode occurs in the following manner. Referring now to FIG. 3B, for a given master cylinder pressure (indicating the driver's desire to apply regenerative braking) while in the second gear ratio, a synchronous shift between the friction elements 34 and 32 is initiated when the power source speed crosses the indicated downshift line. The on-board microprocessor implementing the control system senses the need for a downshift by comparing the current power source speed Wm to the schedule representing FIG. 3B which is stored in an electronic memory accessible to the microprocessor. The microprocessor then sets the wheel torque command Twc 60 to equal the then present output wheel torque Tw from torque sensor 48, and also sets the motor speed command Wmc 58 to 1.53 (the gear ratio step), times the then present output motor speed Wm from sensor 46. The signal Tw can be the signal produced by a strain gauged torque sensor 48 whose output is converted to a digital word representing the torque transmitted through the sensor. The signal Wm is produced by speed sensor and resolver-to-digital converter combination 46, which produces a digital word representing motor speed from an analog speed signal. This action initiated the shift by producing errors, respectively, in wheel torque Twe 68 and in motor speed Wme 76 which act through the control elements of the system to modulate in a closed loop manner the three control variables friction brake pressure 125, second gear clutch pressure 133, and power source output torque Tm. Referring again to FIG. 4, the change of these variables as a function of time can be seen. The absolute magnitudes of these variables have been normalized in the figure to indicate only the relative changes which are occurring in each. As can be seen, the shift is initiated at time equal to 0.1 seconds, when the motor speed error causes the absolute magnitude of friction brake torque TC1 to begin to increase i.e., when the magnitude of torque transmitted by TC1 increases and the absolute magnitude of the second gear friction clutch torque TC2 to begin to decrease as it is released i.e., as the magnitude of torque transmitted by TC1 decreases. The wheel torque error causes the motor torque to change as necessary to help maintain a relatively constant output torque TW. The synchronous modulation of the brake 34, clutch 36, and motor 134 torques in response to the changing error signals 68 and 76 accomplish the shift between the hydraulically actuated second gear clutch 36 and regenerative brake 34 with minimal disturbance in the wheel torque Tw 48 in a relatively short time interval. The details of the operation of the control system elements are described in more general detail in the following paragraph.

Figure 2A:
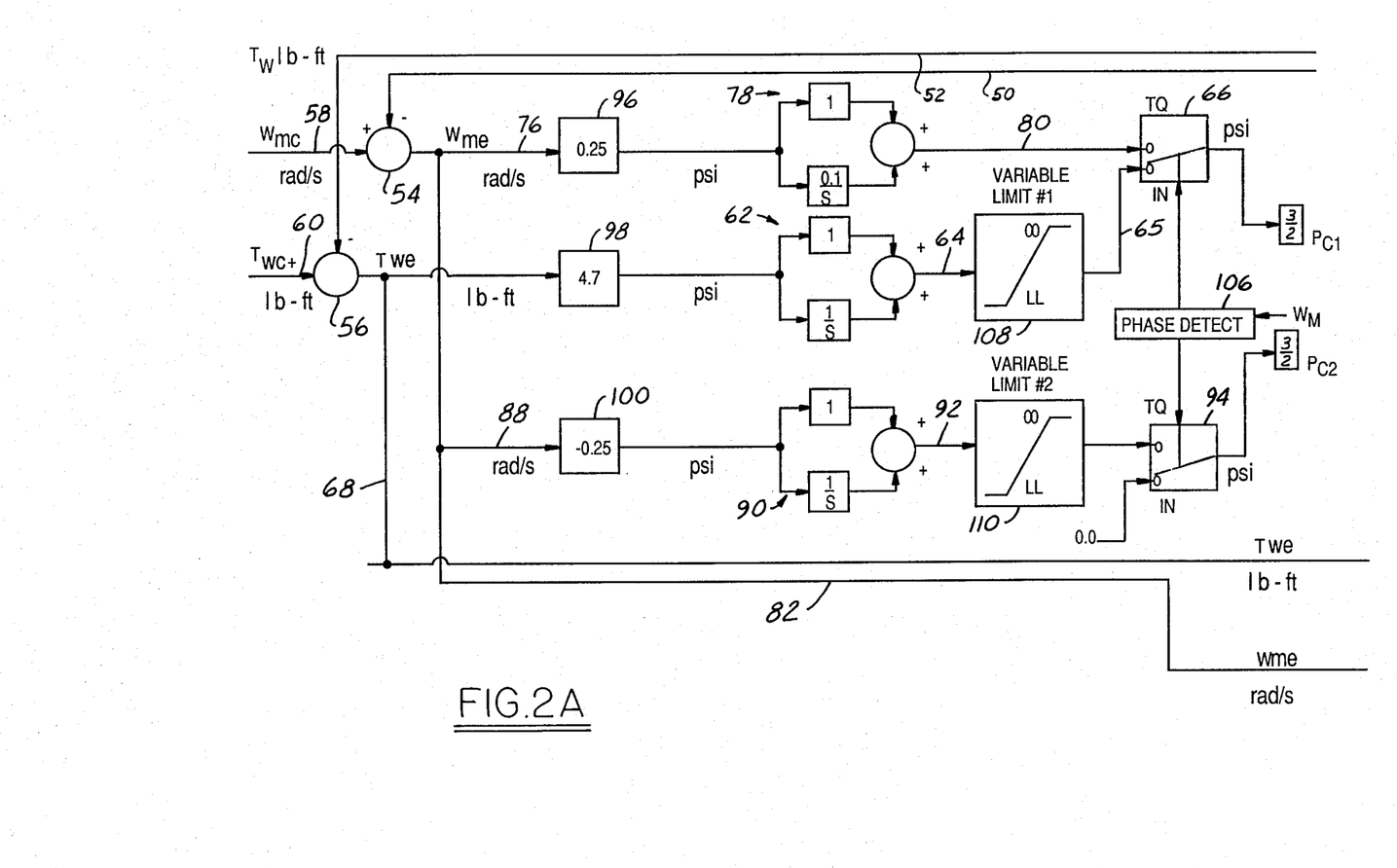
FIGS. 2A and 2B are a schematic diagram of the mathematical model control system according to this invention as it operates during a downshift.
Figure 2B:
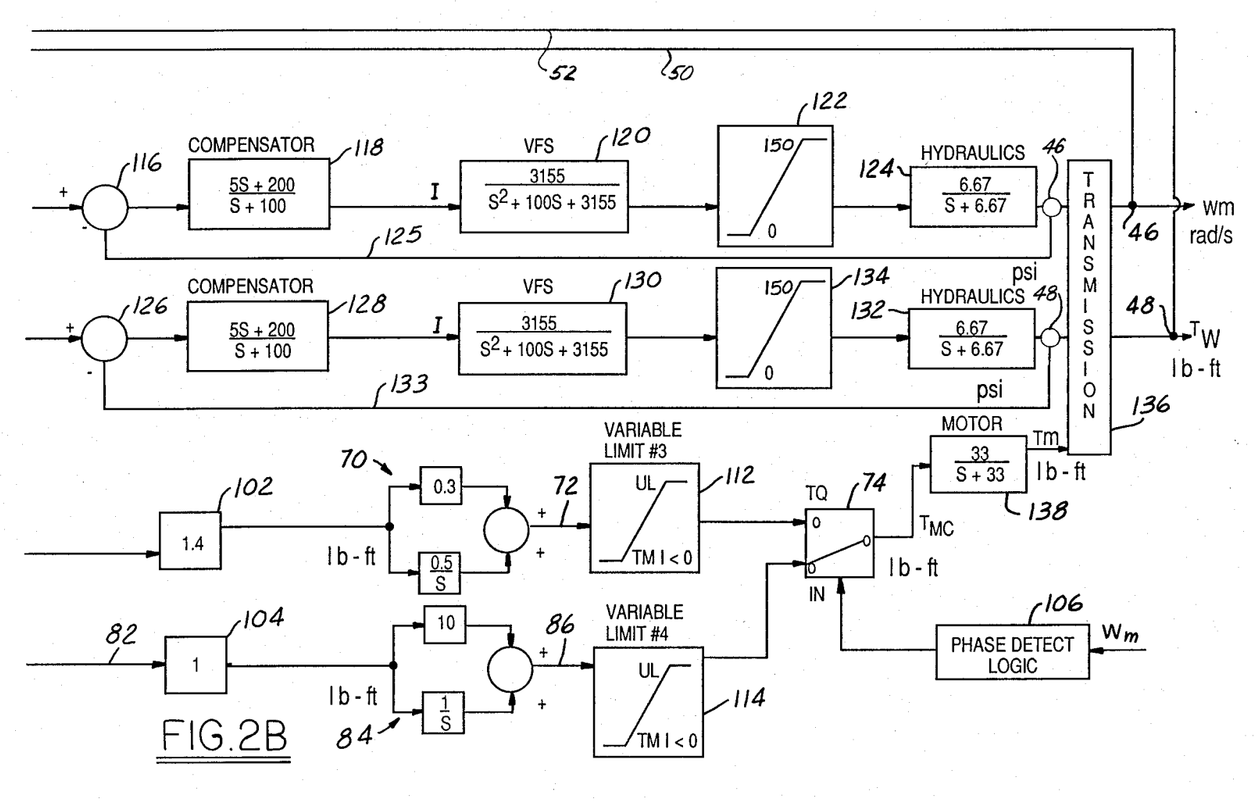

Referring now to FIGS. 2A and 2B, a speed sensor 46 located preferably on the power source shaft produces a signal whose frequency represents information related to the speed of the power source output shaft Wm. A torque sensor 48 produces a signal representing the output torque of the transmission or drive wheels Tw. These signals are carried on lines 50, 52 to summing junctions 54, 56 where they are subtracted from the commanded power source speed Wmc and the commanded output torque Twc carried to the summing junctions on lines 58, 60, respectively. The output of summing junction 56 is a first error Twe defined as the difference between the output torque of the transmission Tw and the commanded transmission output torque Twc. The first error signal is applied as input to a first proportional-integral controller 62 whose output is an inertia phase first friction element control pressure carried on lines 64 through variable limit 108 and line 65 to a phase detect controlled switch 66.

The first error is also carried on line 68 as input to a second proportional-integral controller 70 whose output on line 72 is a torque phase power source torque command eventually supplied to a terminal of a second phase detect controlled switch 74.

The output of junction 54 is a second error Wme, defined as the difference between the actual power source speed and the commanded power source speed.

The second error is carried in line 76 as input to a third proportional-integral controller 78 whose output, a torque phase first friction element control pressure command, is carried on line 80 to a second terminal of phase detect controlled switch 66. The second error is also carried in line 82 and supplied as input to a fourth proportional-integral controller 84 whose output, an inertia phase power source torque command, is carried on line 86 to a second terminal of phase detect controlled switch 74. The second error is also carried on line 88 as input to a fifth proportional-integral controller 90 whose output, a torque phase second friction element control pressure command, is carried on line 92 to a first terminal of phase detect switch 94. A second terminal of switch 94 is continuously supplied with a signal representing the low or off state represented by 0.0 volts.

Gain 96 is applied to the second error signal before it is input to controller 78; its value is positive for upshifts and downshifts. Gain 98 is applied to the first error signal before it is input to controller 62; its value is negative for downshifts and positive for upshifts. Gain 100 is applied to the output of the second error signal before it is applied to controller 90; its value is negative for both upshifts and downshifts. Gain 102 is applied to the second error signal before it is applied as input to controller 70; its value is positive for upshifts and downshifts. Gain 104 is applied to the second error signal before it is input to controller 84; its value is $-1.0$ for upshifts and $+1.0$ for downshifts.

The state of phase detect controlled switches 66, 74, 94 is determined by a phase detect logical operator 106 which maintains the phase switches in the torque phase position while the speed of the power source is within predetermined range of the power source speed at the beginning of the gear ratio change and alters the state of the phase switches to the inertia phase position when the power source speed changes by a predetermined magnitude or percentage of the power source speed at the beginning of the gear ratio change.

FIGS. 2A and 2B show the connections made to the terminals of the phase detect switches during a downshift.

FIG. 2C shows the connection or values applied to the terminals of the phase detect switches during an upshift. The control logic connects low voltage to both terminals of switch 66. The torque phase terminal of switch 94 is connected to the output of controller 90, and the inertia phase terminal of switch 94 is connected to the output of controller 62. The torque phase terminal of switch 74 is connected to the output of controller 70, and the inertia phase terminal of that switch is connected to the output of controller 84.

A lower limit is set for the output of controller 62 in order to minimize the wheel torque transient during a gear ratio change. The limits reflect the clutch pressure commands and the motor speed command required at various times during the shift to keep the torque wheel transient low. The lower limit LL during a downshift for the output of controller 62 is:

$$LL_{108} = [(G_h \times K_2 \times P_2/G_1) - (R_1/S_1)(1+e)(TMF)]/K_1$$

wherein $G_h$ is the second or high gear ratio; $K_2$ is a constant that converts second gear clutch pressure to clutch torque; $P_2$ is the second clutch pressure; $G_1$ is the first or low gear ratio; $R_1$ is the radius of ring gear 18; $S_1$ is the radius of sun gear 10; TMF is the power source torque at the end of the gear shift; $K_1$ is a constant that converts clutch pressure to clutch torque for the first gear brake 34; and e equals 0.01, a tolerance on an acceptable range of wheel torque error. The lower limit of controller 62 output during an upshift is:

$$LL_{108} = [TMF*0.995(R_1/S_1)]/K_2$$

The lower limit set by limiter 110 for the output produced by controller 90 during a downshift is:

$$LL_{110} = -[(R_1/S_1) \times TM + (K_1 \times P_1)]/K_2$$

wherein TM is the instantaneous motor torque. During an upshift $LL_{110} = 0.0$, and the upper limit $$UL_{110} = [1.005 \times (R_1/S_1) \times TMF]K_2$$

The lower limit for the output of controller 70 during an upshift and downshift is TMI, which is the power source torque at the beginning of the gear ratio change. The upper limit $UL_{112}$ for the output of controller 70 during a downshift is:

$$UL_{112} = TMI + (K_1 \times P_1)/G_h$$

The upper limit for controller 70 during an upshift is:

$$UL_{112} = 1.005 \times TMF$$

The lower limit for the output of controller 84 during an upshift and downshift is TMI. The upper limit for the output of controller 84 during a downshift is:

$$UL_{114} = (1+e-d)TMF + (K_2 \times P_2)/G_1$$

wherein d is a factor which allows the power source torque to vary by a substantial margin from its required final value early in the shift, and by only a small margin towards the end of the shift. If the instantaneous power source speed is close to the commanded power source speed, i.e., near the end of the shift, d is approximately 0.1; if the instantaneous power source speed is relatively far from the commanded power source speed, i.e., early in the shift interval, d is approximately 0.5. During an upshift, $$UL_{114} = (1+e-d)TMF$$

The torque and inertia phase pressure signal output from switch 66 is applied through a 3/2 gain to summing junction 116, to which the actual hydraulic pressure on regenerative brake 34 is fed back producing a third error signal. This interior feedback loop includes compensator 118, a variable force solenoid 120, a limiter 122 and a hydraulic circuit 124, which includes a source of pressurized fluid supplied to a hydraulic valve whose state is controlled by the output of the variable force solenoid 120 and a hydraulic actuator including a friction element piston, friction discs mounted on the components connected driveably by the friction element, and a load block to react to hydraulic force produced on the piston. Hydraulic pressure from the hydraulic valve pressurizes the hydraulic cylinder and causes frictional contact between the rotating member of brake 34 and the transmission casing. In FIG. 2, the transfer functions for the compensators, variable force solenoids, motor, controllers and hydraulic circuit are stated in terms of the LaPlace transformer operator S.

The torque and inertia phase second gear clutch and pressure output from switch 94 is passed through a 3/2 gain and applied as input to summing junction 126, to which the actual hydraulic pressure in clutch 36 is fed back. A fourth error signal produced at junction 126 is applied as input to compensator 128, whose output is a current supplied to the winding of a variable force solenoid 130, which controls the pressurized and vented state of a hydraulic circuit 132 which includes a valve supplied from a source of hydraulic pressure to pressurize a cylinder, thereby driveably connecting friction disc elements of clutch 36. Limiter 134 controls the range of control pressure output from the hydraulic valve controlled through operation of the variable force solenoid 130 and supplied as input to the hydraulic actuator of clutch 36.

Torque and inertia phase power source torque output from switch 74 are applied as input to the controller of motor 138, which produces an output torque that drives the input shaft of the transmission 136.

When the control system is programmed in the onboard microprocessor, those blocks in the mathematical model shown in FIG. 2B which represent vehicle hardware are removed from the schematic diagram. This includes the variable force solenoids (VFS) 120, 130, the limiters 122, 134, the hydraulics 124, 132, the motor 138, and the transmission 136. These elements are functionally replaced by the actual hardware in the in-vehicle system.

Figure 4:
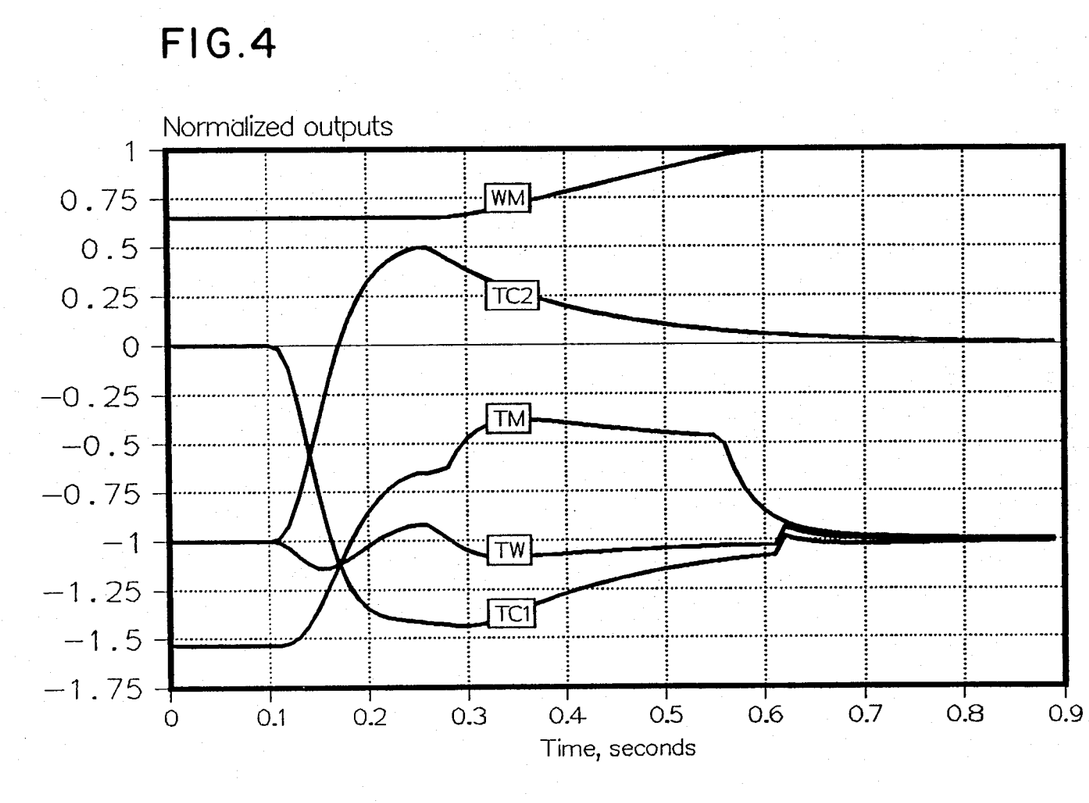
FIG. 4 is a graph representative of the normalized output of the simulation of the control system. It indicates the relative change, over the duration of a downshift, in the variables of interest. Negative values of torque are by definition torques which tend to decelerate the vehicle.

FIG. 4 illustrates the variation of the normalized variables during a synchronous downshift using the control system of this invention. The variables are TW, transmission output torque; TM, power source output torque; WM, power source speed; $Tc_1$, transmission brake 34 torque; and $Tc_2$, second gear clutch 36 torque. Negative torque valves tend to decelerate the vehicle.

Having described the preferred embodiment of our invention, what we claim and desire to secure by U.S. Letters Patent is:

1. In a powertain that includes a multiple gear ratio automatic transmission drivably connecting a power source and the drive wheels of a motor vehicle and having a gearset and multiple friction elements whose selective engagement and disengagement determine the operating gear ratio, a method for controlling a synchronous gear ratio change comprising the steps of:

producing a commanded power source speed Wmc;

producing a commanded transmission output torque Twc;

producing signals representing the instantaneous output torque of the transmission and the instantaneous power source speed;

generating a first error Twe defined as the difference between the output torque of the transmission and the commanded transmission output torque;

applying the first error signal to a first controller and obtaining as output of said first controller an inertia phase first friction element control pressure command;

applying the first error as input to a second controller and obtaining as the output of said second controller a torque phase power source torque command;

generating a second error Wme defined as the difference between the actual speed of the power source and the commanded speed of the power source;

applying the second error as input to a third controller and obtaining as the output of said third controller a torque phase first friction element control pressure command;

applying the second error as input to a fourth controller and obtaining as the output of said fourth controller a torque phase second friction element control pressure command;

applying the second error as input to a fifth controller and obtaining as the output of said fifth controller an inertia phase power source torque command;

producing a first friction element control pressure command from the output of said first controller provided the gear ratio change is in the inertia phase, or from the output of said third controller provided the gear ratio change is in the torque phase;

producing a second friction element control pressure command from the output of said fourth controller provided the gear ratio change is in the torque phase;

producing a power source torque command from the output of said second controller provided the gear ratio change is in the torque phase, or from the output of said fifth controller provided the gear ratio change is in the inertia phase;

controlling the torque produced by the power source by supplying to a power source control unit the power source torque command corresponding to the inertia phase or torque phase of the gear ratio change; and controlling the torque transmitted by the friction elements, hence the gear ratio, by supplying pressure to the friction elements in accordance with the friction element pressure error derived from the difference between the friction element control pressure commands and the corresponding actual friction element pressures.

2. The method of claim 1 wherein producing the second friction element pressure command includes setting said command to zero provided the gear ratio change is in the torque phase.

3. The method of claim 1 wherein producing a commanded power source speed includes:

determining the desired gear ratio at the conclusion of the gear ratio change;

determining the speed of the power source at the beginning of the gear shift; and correcting said speed at the beginning of the shift to the commanded power source speed in accordance with the desired gear ratio at the conclusion of the gear ratio change.

4. The method of claim 1 wherein:

the first controller develops a correcting effect proportional to the first error and in proportion to the time integral of the first error;

the second controller develops a correcting effect proportional to the first error and in proportion to the time integral of the first error;

the third controller develops a correcting effect proportional to the second error and in proportion to the time integral of the second error;

the fourth controller develops a correcting effect proportional to the second error and in proportion to the time integral of the second error; and the fifth controller develops a correcting effect proportional to the second error and in proportion to the time integral of the second error.

5. The method of claim 1 further comprising:

detecting the phase of the gear shift;

directing the output of the first and third controllers to the input of a first friction element control loop in accordance with the torque or inertia phase that is detected, respectively;

directing the output of the second and fifth controllers to the input of a power source control loop in accordance with the torque or inertia phase that is detected, respectively; and directing the output of the fourth controller to the input of a second friction element control loop when the torque phase is detected.

6. The method of claim 1 wherein producing the first friction element control pressure command comprises:

determining a first friction element control pressure error defined as the difference between the actual first friction element pressure and the output of the first controller or the third controller in accordance with the gear ratio phase;

applying the first friction element control pressure error as input to a compensator;

applying electrical current in accordance with the output of the compensator to the winding of a solenoid; and pressurizing and venting a first friction element in accordance with the energized and deenergized state of the solenoid.

7. The method of claim 6 further comprising detecting the phase of the gear ratio change;

directing the output of the fourth and first controllers to the input of a friction element control loop in accordance with the torque or inertia phase that is detected, respectively;

directing the output of the second and fifth controllers to the input of a power source control loop in accordance with the torque or inertia phase that is detected, respectively.

8. The method of claim 1 wherein producing the second friction element control pressure command comprises:

determining a second friction element control pressure error defined as the difference between the actual second friction element pressure and the output of the fourth controller;

applying the second first friction element control pressure error as input to a compensator;

applying electrical current in accordance with the output of the compensator to the winding of a solenoid; and pressurizing and venting a second friction element in accordance with the energized and deenergized state of the solenoid.

9. The method of claim 8 wherein:

the first controller develops a correcting effect proportional to the first error and in proportion to the time integral of the first error;

the second controller develops a correcting effect proportional to the first error and in proportion to the time integral of the first error;

10. The method of claim 8 further comprising:
detecting the phase of the gear ratio change;
directing the output of the fourth and first controllers to the input of a friction element control loop in accordance with the torque or inertia phase that is detected, respectively;
directing the output of the second and fifth controllers to the input of a power source control loop in accordance with the torque or inertia phase that is detected, respectively.

11. The method of claim 8 further comprising:
detecting the phase of the gear ratio change;
directing the output of the fourth and first controllers to the input of a friction element control loop in accordance with the torque or inertia phase that is detected, respectively;
directing the output of the second and fifth controllers to the input of a power source control loop in accordance with the torque or inertia phase that is detected, respectively.

12. The method of claim 8 wherein producing the friction element control pressure command comprises:
determining a friction element control pressure error defined as the difference between the actual friction element pressure and the output of the first controller or the third controller in accordance with the gear ratio phase;
applying the friction element control pressure error as input to a compensator;
applying electrical current in accordance with the output of the compensator to the winding of a solenoid; and
pressurizing and venting the friction element in accordance with the energized and deenergized state of the solenoid.

13. The method of claim 8 wherein:
the first controller develops a correcting effect proportional to the first error and in proportion to the time integral of the first error;
the second controller develops a correcting effect proportional to the first error and in proportion to the time integral of the first error;
the fourth controller develops a correcting effect proportional to the second error and in proportion to the time integral of the second error; and
the fifth controller develops a correcting effect proportional to the second error and in proportion to the time integral of the second error.

14. The method of claim 8 further comprising:
detecting the phase of the gear ratio change;
directing the output of the fourth and first controllers to the input of a friction element control loop in accordance with the torque or inertia phase that is detected, respectively;
directing the output of the second and fifth controllers to the input of a power source control loop in accordance with the torque or inertia phase that is detected, respectively.

15. The method of claim 8 further comprising:
detecting the phase of the gear ratio change;
directing the output of the fourth and first controllers to the input of a friction element control loop in accordance with the torque or inertia phase that is detected, respectively;
directing the output of the second and fifth controllers to the input of a Power source control loop in accordance with the torque or inertia phase that is detected, respectively.

16. In a powertrain that includes a multiple gear ratio automatic transmission drivably connecting a power source and the drive wheels of a motor vehicle and having a gearset and multiple friction elements whose selective engagement and disengagement determine the operating gear ratio, a method for controlling a synchronous gear ratio change comprising the steps of:
producing signals representing the instantaneous output torque of the transmission and the instantaneous power source speed;
generating a first error Twe defined as the difference between the output torque of the transmission and the commanded transmission output torque;
generating a second error Wme defined as the difference between the actual power source speed and the commended power source speed;
applying the first error as input to a first controller and obtaining as the output of said first controller an inertia phase friction element control pressure command;
applying the first error as input to a second controller and obtaining as the output of said second controller a torque phase power source torque command;
applying the second error as input to a fourth controller and obtaining as the output of said fourth controller a torque phase friction element control pressure command;
applying the second error as input to a fifth controller and obtaining as the output of said fifth controller an inertia phase power source torque command;
producing a friction element control pressure command from the output of said first controller provided the gear ratio change is in the inertia phase, or from the output of said fourth controller provided the gear ratio change is in the torque phase;
producing a power source torque command from the output of said second controller provided the gear ratio change is in the torque phase, or from the output of said fifth controller provided the gear ratio change is in the inertia phase;
controlling the torque produced by the power source by supplying to a power source control unit the power source torque command corresponding to the inertia phase or torque phase of the gear ratio change; and
controlling the torque transmitted by the friction elements, hence the gear ratio, by supplying pressure to the friction elements in accordance with the friction element pressure error derived from the difference between the friction element control pressure command and the corresponding actual friction element pressure.

17. The method of claim 16 wherein:
the first controller develops a correcting effect proportional to the first error and in proportion to the time integral of the first error;
the second controller develops a correcting effect proportional to the first error and in proportion to the time integral of the first error;
the fourth controller develops a correcting effect proportional to the second error and in proportion to the time integral of the second error; and the fifth controller develops a correcting effect proportional to the second error and in proportion to the time integral of the second error.

18. The method of claim 17 further comprising:
detecting the phase of the gear ratio change;
directing the output of the fourth and first controllers to the input of a friction element control loop in accordance with the torque or inertia phase that is detected, respectively;
directing the output of the second and fifth
controllers to the input of a power source control loop in accordance with the torque or inertia phase that is detected, respectively.

19. The method of claim 16 further comprising:
detecting the phase of the gear ratio change;
directing the output of the fourth and first controllers to the input of a friction element control loop in accordance with the torque or inertia phase that is detected, respectively;
directing the output of the second and fifth controllers to the input of a power source control loop in accordance with the torque or inertia phase that is detected, respectively.

20. The method of claim 16 wherein producing the friction element control pressure command comprises:
determining a friction element control pressure error defined as the difference between the actual friction element pressure and the output of the first controller;
applying the friction element control pressure error as input to a compensator;
applying electrical current in accordance with the output of the compensator to the winding of a solenoid; and
pressurizing and venting the friction element in accordance with the energized and deenergized state of the solenoid.

21. The method of claim 20 wherein:
the first controller develops a correcting effect proportional to the first error and in proportion to the time integral of the first error;
the second controller develops a correcting effect proportional to the first error and in proportion to the time integral of the first error;
the fourth controller develops a correcting effect proportional to the second error and in proportion to the time integral of the second error; and
the fifth controller develops a correcting effect proportional to the second error and in proportion to the time integral of the second error.

22. The method of claim 20 further comprising:
detecting the phase of the gear ratio change;
directing the output of the fourth and first controllers to the input of a friction element control loop in accordance with the torque or inertia phase that is detected, respectively;
directing the output of the second and fifth controllers to the input of a power source control loop in accordance with the torque or inertia phase that is detected, respectively.

* * * * *